United States Patent [19]
Nakajima et al.

[11] Patent Number: 5,669,147
[45] Date of Patent: Sep. 23, 1997

[54] TILT SENSOR

[75] Inventors: Noriaki Nakajima, Yokohama; Hiroshi Hasegawa, Tokyo; Tetsuro Goto, Funabashi, all of Japan

[73] Assignee: Nikon Corporation, Tokyo, Japan

[21] Appl. No.: 767,714

[22] Filed: Dec. 17, 1996

Related U.S. Application Data

[63] Continuation of Ser. No. 599,412, Jan. 11, 1996, abandoned, which is a continuation of Ser. No. 357,775, Dec. 16, 1994, abandoned, which is a continuation of Ser. No. 36,352, Mar. 24, 1993, abandoned.

[30] Foreign Application Priority Data

Apr. 23, 1992 [JP] Japan ................. 4-026682 U

[51] Int. Cl.$^6$ .................. G03B 17/06; H01H 35/02
[52] U.S. Cl. .................. 33/334; 33/366; 200/61.52; 200/276; 200/DIG. 29
[58] Field of Search ............ 33/334, 366; 340/689; 200/61.52, 52 A, 61.45 R, DIG. 29, 61.42, 61.41, 276, 277

[56] References Cited

U.S. PATENT DOCUMENTS

| | | | |
|---|---|---|---|
| 612,670 | 10/1898 | Norman | 200/DIG. 29 |
| 1,107,245 | 8/1914 | Bard | 200/277 |
| 2,154,766 | 4/1939 | Mueller, Sr. | 200/61.52 |
| 2,338,811 | 1/1944 | Hasbrook | 33/366 |
| 2,600,363 | 6/1952 | Morris | 33/334 |
| 2,938,087 | 5/1960 | Meek | 200/61.45 R |
| 2,986,614 | 5/1961 | Minch | 200/61.52 |
| 3,123,801 | 3/1964 | Bosler | 200/61.52 |
| 3,141,936 | 7/1964 | Boyle et al. | 200/276 |
| 3,196,552 | 7/1965 | Richards | 33/366 |
| 3,725,625 | 4/1973 | Pratt | 200/276.1 |
| 4,493,155 | 1/1985 | Comeau et al. | 33/366 |
| 4,591,250 | 5/1986 | Woodruff | 33/334 |
| 5,209,343 | 5/1993 | Romano et al. | 200/61.52 |

FOREIGN PATENT DOCUMENTS 50-87068  7/1975  Japan.

*Primary Examiner*—Thomas B. Will
*Attorney, Agent, or Firm*—Shapiro and Shapiro

[57] ABSTRACT

A tilt sensor comprises at least two elastically deformable electrodes, a ball having conductivity on at least a surface thereof, and a case which is non-conductive on at least an inner surface thereof for sealing therein the electrodes and the ball.

7 Claims, 4 Drawing Sheets

TILT SENSOR

This is a continuation of application Ser. No. 08/599,412 filed Jan. 11, 1996, which is a continuation of application Ser. No. 08/357,775 filed Dec. 16, 1994, which is a continuation of application Ser. No. 08/036,352 filed Mar. 24, 1993, all now abandoned.

BACKGROUND OF THE INVENTION

1. Field of the Invention

The present invention relates to a tilt sensor for sensing an attitude of an equipment.

2. Related Background Art

A tilt sensor has been used to sense an attitude of an equipment. A mercury switch 1 is frequently used in such a tilt sensor. As shown in FIG. 1, mercury 3 is sealed in a glass case 2 and two electrodes 4 and 5 are provided to extend into and from the glass case 2.

The mercury 3 moves in the glass case 2 by its weight in accordance with the attitude of the mercury switch 1, and the mercury 3 short-circuits or opens the electrodes 4 and 5 depending on the movement of the mercury 3.

The two states are detected by an external circuit through the electrodes 4 and 5 to determine the attitude of the equipment.

Because of the advantages that (1) no on/off chattering occurs on the electrodes 4 and 5 because the mercury 3 is liquid, (2) the gravity action is assured by the weight of the mercury, and (3) electrical handling is permitted by the conductivity of the mercury, the mercury switch has been useful as the tilt sensor.

However, the mercury switch 1 has the following disadvantages.

First, when the case 2 is broken, the mercury 3 in the case scatters to the outside. The scattered mercury 3 is dangerous because, it is harmful if it is erroneously absorbed into the human body.

Further, since the mercury 3 has recently been designated as a harmful and dangerous material and the use thereof is restricted, it may not be used for a simple tilt sensor.

SUMMARY OF THE INVENTION

It is an object of the present invention to provide a tilt sensor which does not cause on/off chattering between electrodes.

In order to achieve the above object, a tilt sensor in accordance with one embodiment of the present invention comprises two electrodes, particles each having a conductive surface and a diameter smaller than a distance between the two electrodes, and a non-conductive case for sealing therein the electrodes and the particles.

A tilt sensor in accordance with another embodiment of the present invention comprises two elastically deformable electrodes, a ball having conductivity on a surface thereof and a diameter larger than the distance between the two electrodes, and a non-conductive case for sealing therein the electrodes and the ball.

By using the conductive particles, a tilt sensor which does not cause the on/off chattering between the electrode is achieved.

Also, by using the conductive ball and the elastic electrodes, a tilt sensor which does not cause the on/off chattering between the electrodes is achieved.

DETAILED DESCRIPTION OF THE PREFERRED EMBODIMENTS

Figure 1:
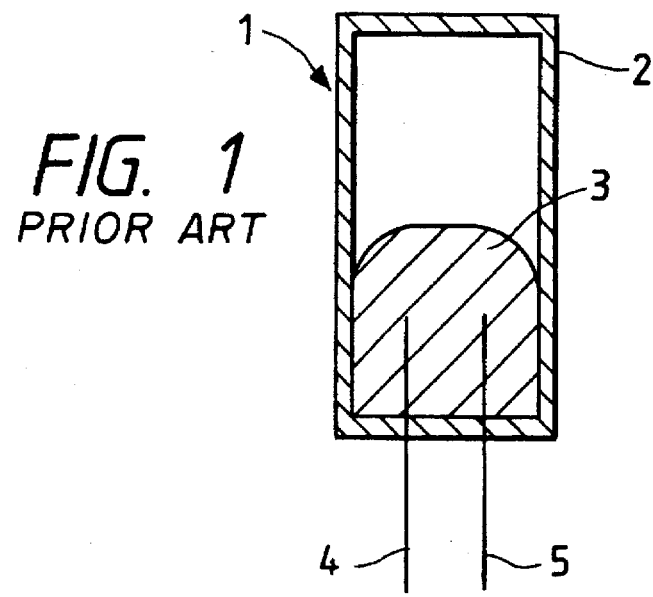
FIG. 1 shows a longitudinal sectional view of a prior art tilt sensor.
Figures 2A, 2B, 2C:
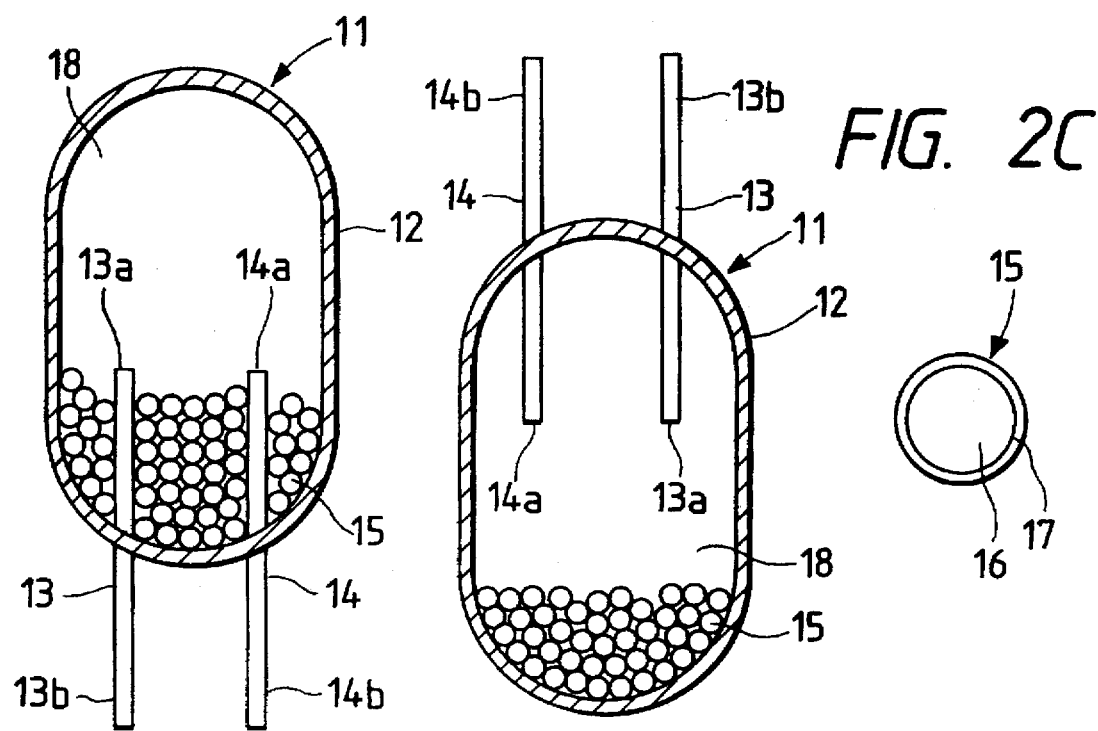
FIGS. 2A to 2C show longitudinal sectional views of a tilt sensor in accordance with a first embodiment of the present invention.

FIGS. 2A to 2C show a first embodiment of the tilt sensor of the present invention.

In the tilt sensor 11, two electrodes 13 and 14 are inserted into a sealing case 12 made of a non-conductive material such as glass or plastic. Conductive particles 15 are filled in the sealing case 12.

The electrodes 13 and 14 extend into the case 12 and the ends 13a and 14a thereof can make contact with the conductive particles 15. Other ends 13b and 14b are connected to a processing circuit (not shown) to permit electrical detection.

As shown in FIG. 2C, the conductive particles 15 have highly conductive platings 17 such as gold or copper on the surfaces 17 of non-magnetic particle bodies 16. The particle bodies 16 may be metal or plastic so long as they have appropriate weight.

The particle bodies 16 are non-magnetic in order to prevent malfunction by an external magnetic field. The platings 17 are applied on the surfaces of the particle bodies 16 in order to assure that each particle makes contact to others to permit a current to flow between the electrodes 13 and 14.

The particles 15 used in the present embodiment have a diameter smaller than the distance between the electrodes. The smaller the diameter of the particles 15 compared to the distance between the electrodes, the closer is the movement of the particles 15 to the behavior of liquid and the smaller is the chance of chattering between the electrodes 13 and 14.

The interior 18 of the case 12 is evacuated or $N_2$ gas filled therein to prevent oxidization or corrosion of the plating 17.

FIG. 2A shows the tilt sensor 11 in an upright position. Two or more particles 15 come into the area between the electrodes 13a and 14a to make the contact. FIG. 2B shows the tilt sensor 11 in an upside down position. No particle 15 contacts to the electrodes 13a and 14a and the switch is in an off-state.

A cross-section of the case 12 need not be circular and it may be polygonal, for example.

Figure 3A:
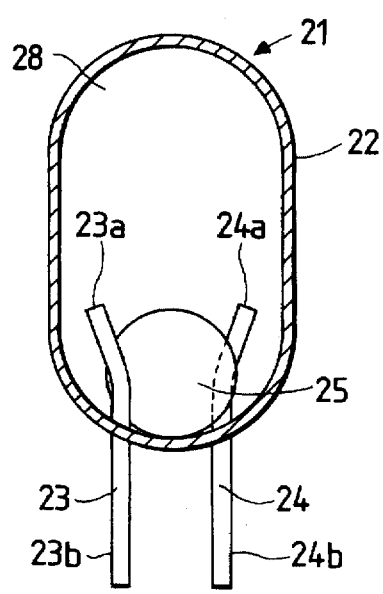
FIGS. 3A to 3C show longitudinal sectional views of a tilt sensor in accordance with a second embodiment of the present invention.
Figure 3B:
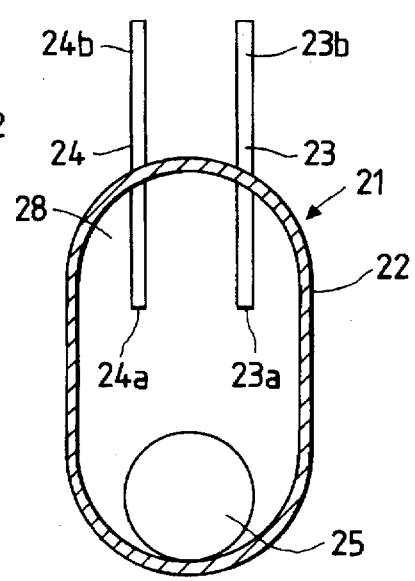
Figure 3C:
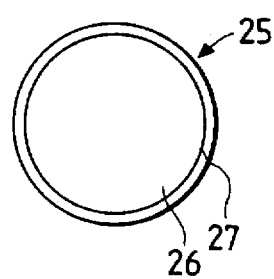

FIGS. 3A to 3C show a second embodiment of the tilt sensor of the present invention.

In the tilt sensor 21, two electrodes 23 and 24 are inserted into a sealing case 22 made of a non-conductive material such as glass or plastic. A conductive ball 25 is provided in the sealing case 22.

The electrodes 23 and 24 extend into the case 22 so that ends 23a and 24a thereof can make contact with the conductive ball 25. Other ends 23b and 24b are connected to a processing circuit (not shown) to permit electrical detection.

As shown in FIG. 3C, the ball 25 has a highly conductive plating 27 such as gold or copper applied on a surface of a non-magnetic ball body 26. The ball body 26 may be metal or plastic so long as it has appropriate weight.

At least the electrode portions 23a and 24a which are arranged in the case 22 must have elasticity in order to avoid chatter of the electrodes. By the elastic deformation of the electrodes, the electrodes can follow the outer periphery of the ball 25 even if the ball 25 moves off the electrodes. Further, when the ball 25 makes contact to the electrodes, the electrodes do not kick back the ball 25 and the chattering is prevented.

The ball body 26 is non-magnetic in order to prevent malfunction by an external magnetic field. The ball body 26 is plated by the plating 27 so that the electrodes 23a and 24a and the ball 25 make contact to each other to flow a current therebetween.

The interior 28 of the case 22 is evacuated or filled with $N_2$ gas to prevent oxidization or corrosion of the plating 27.

An operation of the tilt sensor 21 is described below. FIG. 3A shows the tilt sensor 21 in an upright position. The ball 25 comes to the space between the electrodes 23a and 24a to make contact. FIG. 3B shows the tilt sensor 21 in an upside down position. The ball 25 does not contact the electrodes 23a and 24a and the switch is in an off-state.

Figure 4A:
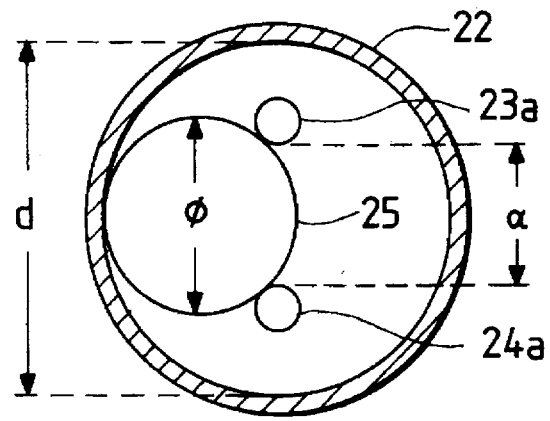
FIGS. 4A to 4C show cross-sectional views of the tilt sensor of the second embodiment showing a dimensional relation between a distance α between electrodes, a diameter φ of a ball and an inner diameter d of a case.
Figure 4B:
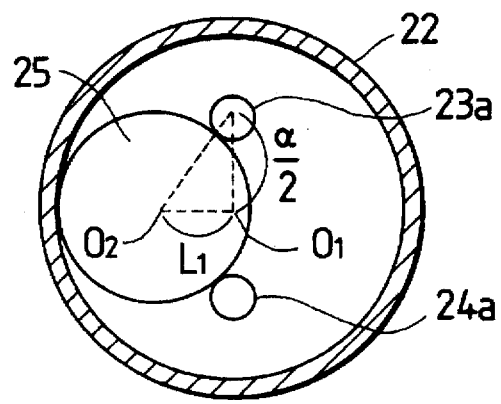
Figure 4C:
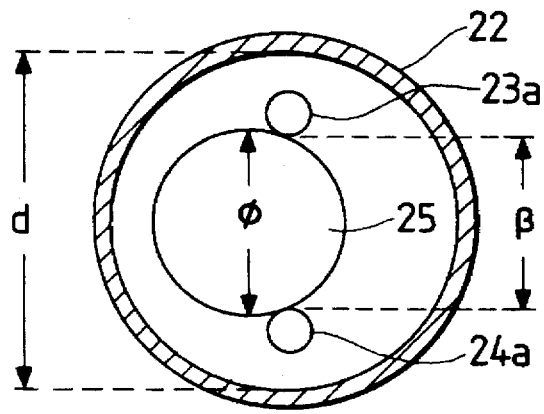

FIGS. 4A to 4C show dimensional relation between the distance $\alpha$ between the electrodes 23a and 24a, the diameter $\phi$ of the ball 25 and the inner diameter d of the case 22.

When the tilt sensor 21 is in the on-state as shown in FIG. 3A, the ball 25 is at the position of FIG. 4A or FIG. 4C.

In FIG. 4A, the ball 25 contacts three points, the electrodes 23a and 24a and the inner wall of the case 22.

The diameter $\phi$ of the ball and the distance $\alpha$ between the electrodes are discussed below.

When the cross-section of the case 22 is circular and a line connecting the two electrodes passes the center of the circle, the dimensions should be determined to meet the formulas (1) and (2), assuming that the diameter of the electrodes is zero.

$$d/2 < \phi < d \quad (1)$$

$$\alpha = (2\phi d - d^2)^{1/2} \quad (2)$$

For the formula (1), since the ball 25 should contact to the inner wall of the case 22 and the two electrodes, the diameter $\phi$ of the ball 25 should be larger than $d/2$. Further, the diameter $\phi$ of the ball 25 should be smaller than the diameter d of the inner wall of the case 22 in order for the ball 25 accommodated in the case 22.

The formula (2) is discussed with reference to FIG. 4B. A distance from a center $O_1$ of the case 22 to the electrode 23a is $\alpha/2$, and a distance L1 from the center $O_1$ of the case 22 to a center $O_2$ of the ball 25 is $(d/2-\phi/2)$.

In FIG. 4C, the ball 25 is held between the electrodes 23a and 24a. The distance $\alpha$ between the electrodes 23a and 24a changes to $\beta$ as the elastic electrodes 23a and 24a are spread out by the ball 25.

Figure 5:
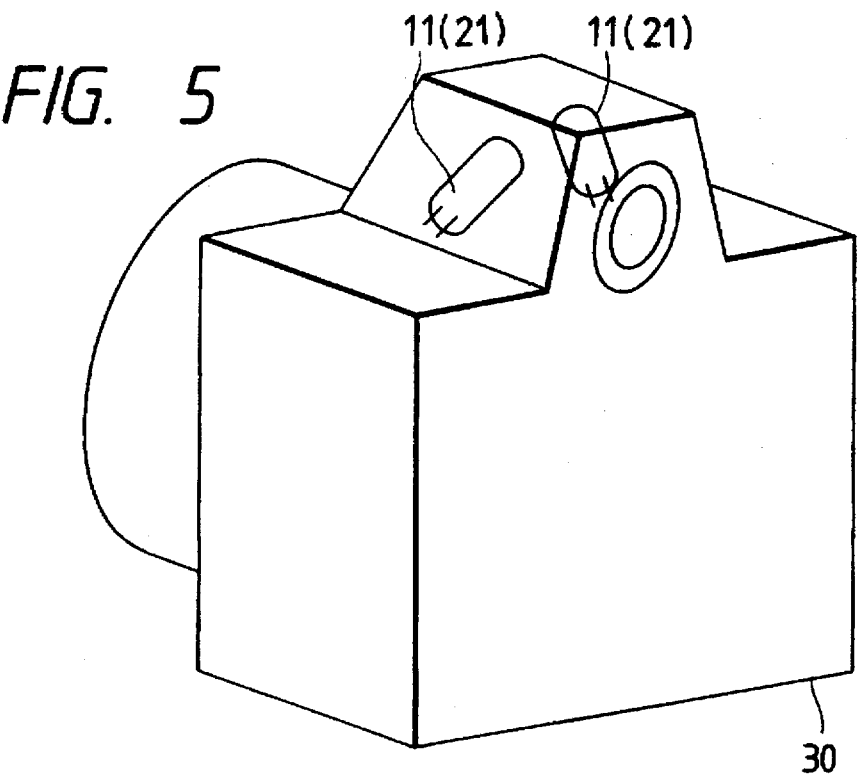
FIG. 5 shows the tilt sensor of the embodiment attached to a camera.

FIG. 5 shows a camera 30 having two tilt sensors 11 or 21 built therein. As shown in FIG. 5, two tilt sensors 11 or 21 are arranged in the camera at different inclinations. Signals from the respective electrodes change depending on the attitude of the camera 30 such as normal position or longitudinal position so that a change of a framing of the camera from a lateral position to a longitudinal position is detected.

Figure 6A:
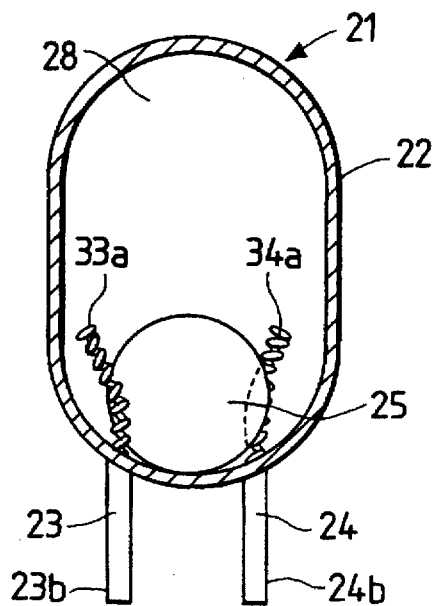
FIGS. 6A and 6B show longitudinal sectional views of the tilt sensor of the second embodiment in which coiled electrodes are used.
Figure 6B:
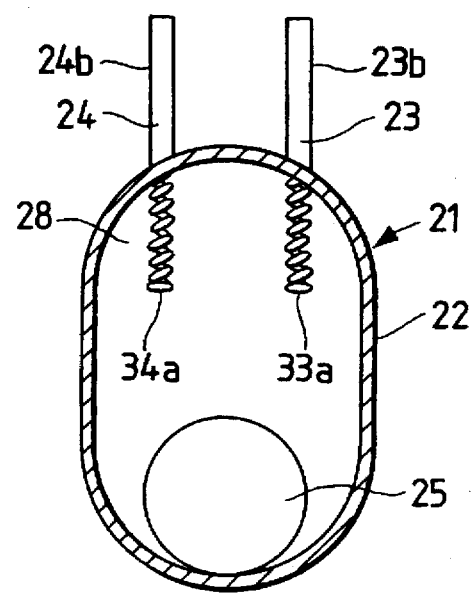

In FIGS. 6A and 6B, the portions of the electrodes in the case 22 are coil-shaped as shown at 33a and 34a.

In accordance with the tilt sensor of the present invention, the on/off chattering between the electrodes is prevented by the use of conductive particles, and the potential for scatter of the mercury associated with the prior art is avoided.

Further, the on/off chattering between the electrodes is prevented by the use of the conductive ball and the elastic electrodes.

What is claimed is:

1. A tilt sensor for detecting an inclination, comprising:

a case having a non-conductive inner surface;

a plurality of electrodes having respective contact portions enclosed within said cases; and a ball having a conductive outer surface and enclosed within said case, said ball being movable within said case by gravity and having a diameter greater than a distance between said contact portions of said electrodes such that said contact portions are electrically connectable through said ball, said contact portions of said electrodes being constituted as elastically deformable coils which are elastically deformable by contact of said ball with intermediate lengthwise portions of said coils, irrespective of directions of contact by said ball.

2. A tilt sensor according to claim 1, wherein said ball is non-magnetic.

3. A tilt sensor according to claim 2, wherein said ball has a non-conductive inner body.

4. A tilt sensor according to claim 1, wherein an interior of said case is evacuated.

5. A tilt sensor according to claim 1, wherein an interior of said case is filled with inert gas.

6. A tilt sensor according to claim 1, wherein each of said coils has a substantially straight axis.

7. A tilt sensor according to claim 1, wherein said coils constitute substantially the only parts of said electrodes that are enclosed in said case.

* * * * *